No. 628,192. Patented July 4, 1899.
R. WAPSHARE.
PNEUMATIC TIRE.
(Application filed Sept. 4, 1897.)
(No Model.)
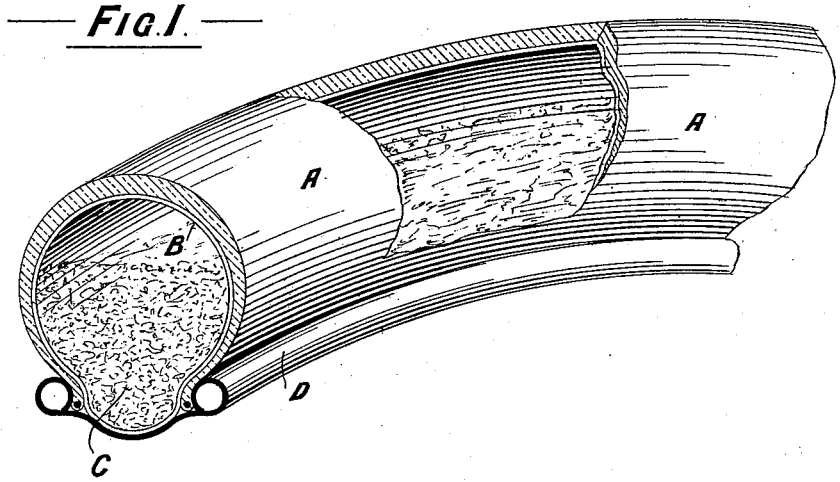
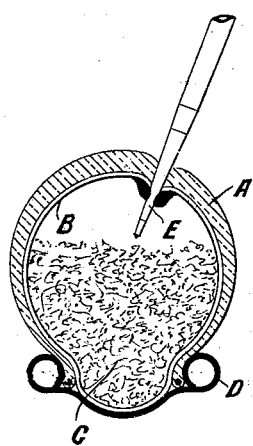
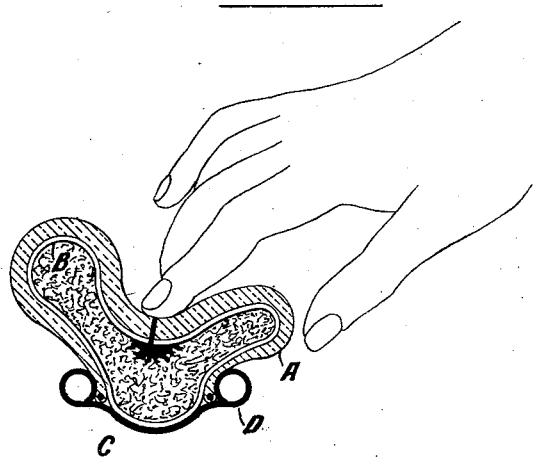
Witnesses:-
Fred H Harris
George Barry Jr.
Inventor:-
Richard Wapshare
by attorneys
Brown & Seward

UNITED STATES PATENT OFFICE.

RICHARD WAPSHARE, OF MORETON-HAMPSTEAD, ENGLAND.

PNEUMATIC TIRE.

SPECIFICATION forming part of Letters Patent No. 628,192, dated July 4, 1899.

Application filed September 4, 1897. Serial No. 650,564. (No model.)

*To all whom it may concern:*

Be it known that I, RICHARD WAPSHARE, major Third Lancers, Hyderabad contingent, at present of Narramore, Moreton-Hampstead, county of Devon, England, have invented certain new and useful Improvements Relating to Pneumatic Tires and other Air-Inflated Articles, of which the following is a specification.

The chief object of the present invention is to effect the permanent repair of air-inflated or pneumatic tires when they become punctured without removing the outer cover or, it may be, the tire from the rim; but the invention also applies to the repair of other air-inflated articles should they from any cause be punctured.

In the accompanying drawings I have shown my invention as applied to tires for cycles which comprise an inner or air tube and an outside cover.

Figure 1 is an outside view, partly in section. Fig. 2 is a cross-section with the point of the solution-injector inserted with the view of repairing a puncture. Fig. 3 is also a cross-section of the tire at a later stage of the repairing operation.

For the purposes of my invention the air-tube is filled or partly filled with a fibrous material, such as cotton-wool or asbestos, in a loose, flocculent, or fluffy condition. This material, which does not add appreciably to the weight, is introduced into the tube before the ends are joined up, preferably in the form of a loose sliver.

When the tube is punctured, it will only be necessary to inject a small quantity of india-rubber solution into the hole and press the tube down on the rim. The solution is caused by the cotton-wool or fiber to spread out in the neighborhood of the puncture and to form a film, which adheres firmly to the interior of the tube and effectually seals up the hole from the inside. The tire thus repaired is ready, when reinflated, for immediate use.

The invention is applicable both to single-tube tires and to tires which consist of an outer cover and an inner air-tube. In repairing the latter it is by no means necessary to remove the cover, for having found the damaged place in the cover the point of the injector may be introduced through the same into the inner tube. The instrument may be passed into the inner tube either through the puncture hole or through another hole in close proximity thereto, which may be made by the introduction of the injecting instrument. The solution injected will spread sufficiently to seal both the puncture and the hole made by the injector.

Referring now to the drawings, A is the cover, and B the air-tube.

C is a rope or sliver of cotton-wool or similar fibrous or fluffy material introduced within the tube B.

D is the wheel-rim.

E is the nozzle of the solution-injector seen in Fig. 2.

To repair a puncture, it is only necessary to insert the point of the injector E at or near the hole, as shown at Fig. 2, and to inject a small quantity of rubber solution or equivalent cement. The injector is then withdrawn and the damaged portion is pressed down upon the flocculent or fluffy fibrous material within the tube (see Fig. 3) and the hole becomes effectively sealed from the inside.

The apertures of the injecting-nozzle are by preference at the side; but I make no claim in connection with such construction.

It will be observed that according to this method of repairing there is no patching or application of solution on the outside of the tube, so as to render it sticky and likely to adhere to the cover. Moreover, as above stated, the repair can be effected without removing the tire from the wheel.

The repair of punctured air-cushions, horse-collars, mattresses, or similar air-inflated articles will be effected in the same manner.

If the fibrous material employed in carrying out my invention be in its natural state, like cotton-wool, combustible and the tube has to be subjected to heat for the purpose of curing it or closing it after the introduction into it of such fibrous material, the said material should be so treated in any known way as to render it sufficiently incombustible to prevent its destruction by such heating of the tube.

What I claim is—

The combination with a pneumatic tire, of fibrous material in a loose, flocculent, or fluffy condition, such as cotton-wool, arranged to float throughout the interior of the pneumatic tire in the form of a complete annular rope or sliver for the purpose of forming, in combination with rubber solution which may be injected, a tough, fibrous, adhesive patch at the interior end of the puncture, substantially as described.

RICHARD WAPSHARE.

Witnesses:
T. H. GREEN,
I. C. SHOBBROOK.